(12) United States Patent
Uesu et al.

(10) Patent No.: US 11,348,430 B2
(45) Date of Patent: May 31, 2022

(54) CRISIS RESPONSE ASSESSMENT DEVICE, CRISIS RESPONSE ASSESSMENT METHOD, AND CRISIS RESPONSE ASSESSMENT PROGRAM

(71) Applicant: NIPPON TELEGRAPH AND TELEPHONE CORPORATION, Tokyo (JP)

(72) Inventors: Megumi Uesu, Musashino (JP); Tomohiro Kokogawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/270,057

(22) PCT Filed: Sep. 11, 2019

(86) PCT No.: PCT/JP2019/035768
§ 371 (c)(1),
(2) Date: Feb. 22, 2021

(87) PCT Pub. No.: WO2020/066635
PCT Pub. Date: Apr. 2, 2020

(65) Prior Publication Data
US 2021/0327242 A1 Oct. 21, 2021

(30) Foreign Application Priority Data
Sep. 25, 2018 (JP) .............................. JP2018-178874

(51) Int. Cl.
*G08B 21/02* (2006.01)
*G08B 21/18* (2006.01)
(Continued)

(52) U.S. Cl.
CPC ............. *G08B 21/02* (2013.01); *G06Q 10/06* (2013.01); *G08B 21/182* (2013.01); *G08B 27/00* (2013.01)

(58) Field of Classification Search
CPC ...... G08B 21/02; G08B 21/182; G08B 27/00; G06Q 10/06
(Continued)

(56) References Cited

U.S. PATENT DOCUMENTS 7,336,169 B2 * 2/2008 Coonce .................. G08B 7/062
340/506
10,102,732 B2 * 10/2018 Gersten .................. G08B 21/10
(Continued)

FOREIGN PATENT DOCUMENTS

JP    2004-333550 A    11/2004
JP    2014-120025 A    6/2014

OTHER PUBLICATIONS

Ushiyama, "Characteristics of Victims of the Sep. 2015 Heavy Rainfall Disaster in the Kanto and Tohoku Districts", Japan Society of Civil Engineers Proceedings B1, vol. 72, No. 4, 2016, pp. 11297-11302 (16 pages including English Translation).
(Continued)

*Primary Examiner* — John A Tweel, Jr.
(74) *Attorney, Agent, or Firm* — Xsensus LLP (57) ABSTRACT

A danger response evaluation device estimates the content of a possible danger through simulation using observation data acquired from an external device. Then, when the estimated content of the danger exceeds a predetermined threshold value, the danger response evaluation device gives, to a user terminal of a user, notification of an alarm that prompts a response to the danger. Thereafter, when having acquired the content of a response of the user to the danger from the user terminal of the user, the danger response evaluation device
(Continued)

determines how much the content of the response corresponds to execution of a plan of a response to the danger stored in a storage unit in advance. Then, the danger response evaluation device evaluates, based on a result of the determination, how much the content of the actual response of the user contributes to a damage prevention effect related to the danger.

5 Claims, 5 Drawing Sheets (51) Int. Cl.
*G06Q 10/06* (2012.01)
*G08B 27/00* (2006.01)
(58) Field of Classification Search
USPC .......................................................... 340/540
See application file for complete search history.

(56) References Cited

U.S. PATENT DOCUMENTS

| | | | | |
|---|---|---|---|---|
| 10,540,877 | B1* | 1/2020 | Gersten | H04R 1/326 |
| 11,037,260 | B2* | 6/2021 | Johnson | G06Q 10/06 |
| 2007/0222585 | A1* | 9/2007 | Sabol | G06Q 50/26 |
| | | | | 340/539.11 |
| 2014/0019215 | A1 | 1/2014 | Jung et al. | |
| 2015/0363518 | A1* | 12/2015 | Edgington | G06Q 10/06 |
| | | | | 703/6 |
| 2019/0106965 | A1* | 4/2019 | Davis | G06Q 10/06 |
| 2021/0264767 | A1* | 8/2021 | Ligrani | G08B 25/10 |
| 2021/0267010 | A1* | 8/2021 | Ligrani | H04W 4/023 |
| 2021/0267011 | A1* | 8/2021 | Ligrani | H04W 4/025 |

OTHER PUBLICATIONS

"Risk of Delay in Issuing Evacuation Advisories and Risk of Missing", Available Online At: http://www.webside.jp/report/site/20151130.html, Nov. 30, 2015, 6 pages including English Translation.

Onishi et al., "Measurement of Normality Bias and Majority Synching Bias During Evacuation—Why Do Not People Evacuate in a Disaster ?", IEICE Technical Report, vol. 116, No. 528, 2017, pp. 41-45 (15 pages including English Translation).

Okumuru et al., "Reliance on Disaster Warning and Responses", Civil Engineering Planning Research and Treatises, vol. 18, No. 2, Sep. 2001, pp. 311-316 (13 pages including English Translation).

* cited by examiner

CRISIS RESPONSE ASSESSMENT DEVICE, CRISIS RESPONSE ASSESSMENT METHOD, AND CRISIS RESPONSE ASSESSMENT PROGRAM

CROSS-REFERENCE TO RELATED APPLICATIONS

The present application is based on PCT filing PCT/JP2019/035768, filed Sep. 11, 2019, which claims priority to JP 2018-178874, filed Sep. 25, 2018, the entire contents of each are incorporated herein by reference.

TECHNICAL FIELD

The present invention relates to a danger response evaluation device, a danger response evaluation method, and a danger response evaluation program.

BACKGROUND ART

Such a case has been reported that when an emergency situation such as a natural disaster, an accident, terrorism, or a cyber attack occurs, people do not take an appropriate response to an imminent danger that could damage and harm daily life and organization business activity, and this could result in increased damage (refer to Non-Patent Literatures 1 and 2).

A danger refers to a situation that is not desirable and means, for example, involvement in tsunami or fire, leak of confidential information, or the like. An appropriate response is an action including danger prevention and taken for quick escape and recovery. For example, such appropriate responses are early issue of an evacuation warning, voluntary evacuation to an evacuation center, early creation of a task force, and the like as responses to a natural disaster, and are periodic password change, use of a password difficult to presume, early report of suspicious mail reception, and the like as responses to a cyber attack.

One of reasons why people do not start evacuation or people hesitate to issue a warning even in a dangerous situation is thought to be functions of a normalcy bias in which people think that "I'm an exception", and a majority synching bias (refer to Non-Patent Literature 3). In other words, it is thought to be extremely difficult for people to take an evacuation action without an imminent danger.

In addition, it has been reported that, for example, when citizens have once experienced futility of an evacuation warning by a public administration, their reliance on a warning by the public administration or the like tends to decrease (refer to Non-Patent Literature 4). In other words, it has been known that there exists a psychological wall against an evacuation action as an actual response of citizens or the like after an evacuation warning for the citizens or the like because of a concern for what is called a "cry-wolf effect".

CITATION LIST

Non-Patent Literature

Non-Patent Literature 1: Motoyuki Ushiyama, Journal of JSCE B1 Vol. 72 No. 4, CHARACTERISTICS OF VICTIMS OF THE SEPTEMBER 2015 HEAVY RAINFALL DISASTER IN THE KANTO AND TOHOKU DISTRICTS, [Sep. 10, 2018 search], the Internet <URL: https://www.jstage.jst.go.jp/article/jscejhe/72/4/72_I_12 97/_pdf/-char/ja>

Non-Patent Literature 2: RISK OF ISSUE DELAY OF EVACUATION WARNING AND THE LIKE AND RISK OF "FUTILITY", [Sep. 10, 2018 search], the Internet <URL: http://www.webside.jp/report/site/20151130.html>

Non-Patent Literature 3: Masaki Ohnishi, MEASUREMENT OF NORMALCY BIAS AND MAJORITY SYNCHING BIAS IN EVACUATION, IEICE Technical Report, vol. 116, no. 528, PRMU2016-203, pp. 41-45, March 2017

Non-Patent Literature 4: Makoto Okumura, RELIANCE ON DISASTER WARNING AND RESPONSES, Infrastructure planning review, Vol. 18 No. 2, [Sep. 10, 2018 search], the Internet <URL: https://www.jstage.jst.go.jp/article/journalip1984/18/0/1 8_0_311/_pdf/-char/ja>

SUMMARY OF THE INVENTION

Technical Problem

Conventionally, for example, there has been available a large number of means for giving notification of a risk itself to people (user), such as a weather alert, a disaster announcement, and a threat detection function of anti-virus software. However, no means for providing an incentive for taking, as an actual response, an action such as evacuation after risk (danger) notification has been disclosed. Thus, the present invention aims to solve the above-described problem and provide means for providing an incentive for a user to take a response such as evacuation after danger notification to the user.

Means for Solving the Problem

To solve the above-described problem, a danger response evaluation device of the present invention evaluates a danger response of a user and includes: a danger estimation unit configured to estimate a content of a possible danger of a kind set in advance through simulation using information obtained from outside; a danger determination unit configured to determine whether the estimated content of the danger exceeds a predetermined threshold value; a response notification unit configured to give, to the user, notification of an alarm that prompts a response to the danger when it is determined that the content of the danger exceeds the predetermined threshold value; a response plan storage unit configured to store, for each kind of danger, information indicating a plan of a response to a danger of the kind; a response record unit configured to record a content of an actual response of the user to the danger after the notification of the alarm to the user; a response evaluation unit configured to evaluate how much the content of the actual response of the user to the danger contributes to a damage prevention effect related to the danger by determining how much the content of the actual response of the user corresponds to execution of a plan of a response to the danger stored in the response plan storage unit; and a result notification unit configured to give notification of a result of the evaluation to the user.

Effects of the Invention

According to the present invention, it is possible to provide an incentive for a user to take a response such as evacuation after danger notification to the user.

DESCRIPTION OF EMBODIMENTS

[Embodiment]

The modes (embodiments) for carrying out the present invention will now be described with reference to the accompanying drawings. An exemplary configuration of a system including a danger response evaluation device of the present embodiment will be described below with reference to FIG. 1.

Figure 1:
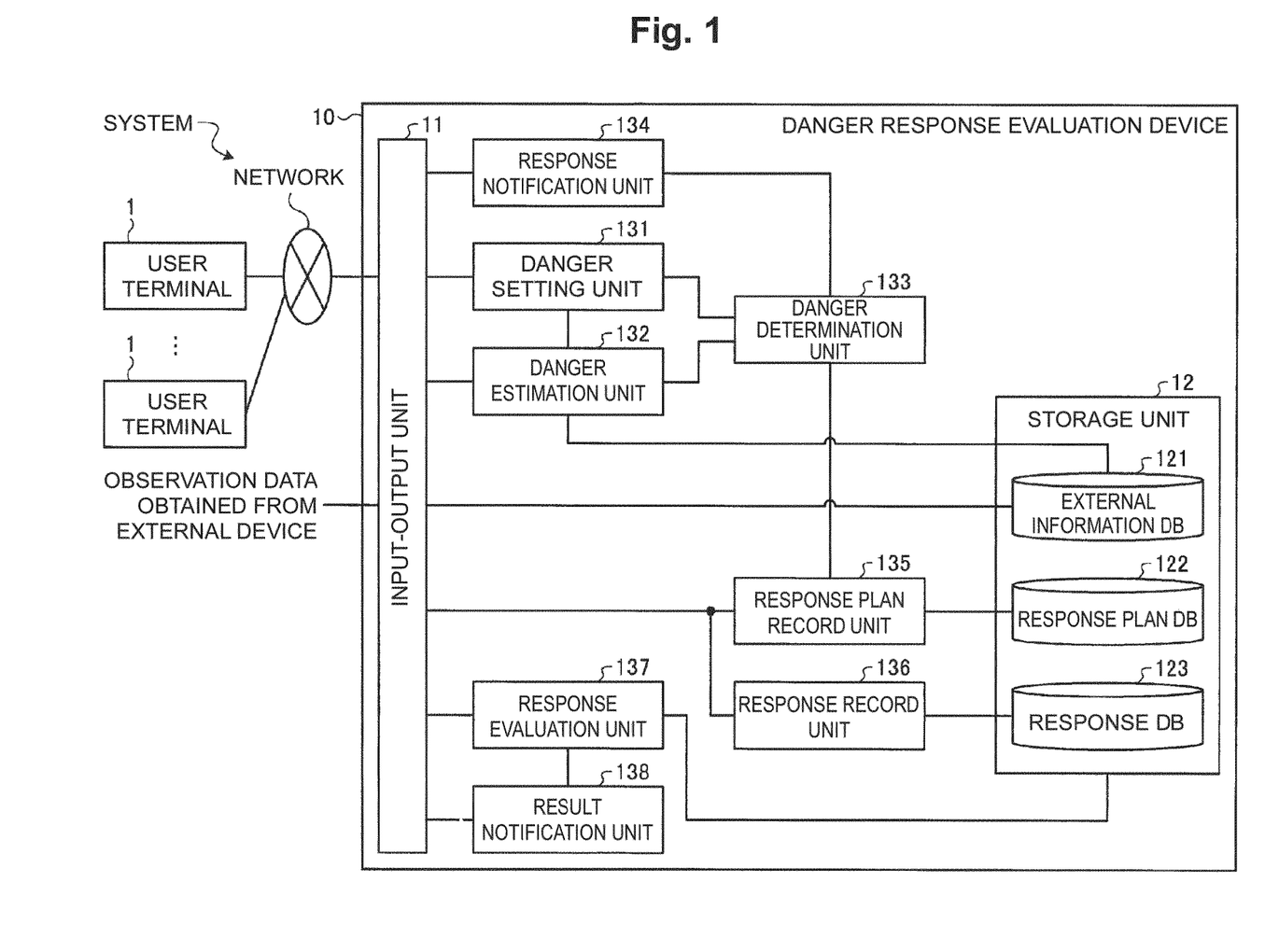
FIG. 1 is a diagram illustrating an exemplary configuration of a system.

For example, as illustrated in FIG. 1, the system includes one or more user terminals 1 and a danger response evaluation device 10. Each user terminal 1 and the danger response evaluation device 10 are, for example, connected with each other through a network such as the Internet. The user terminal 1 is, for example, a terminal used by a user as a danger response evaluation target and is, for example, a personal computer or a smartphone. The user may be an end user who performs a danger response or may be a person who determines a response plan of an end user or coordinates responses of end users.

The danger response evaluation device 10 gives, to the user, notification of an alarm that prompts a response to a danger, and then evaluates an action (response) performed for the danger by the user.

For example, the danger response evaluation device 10 determines how much an actual response of the user to a danger corresponds to execution of a plan of a response to the danger. Accordingly, the danger response evaluation device 10 evaluates how much the response of the user contributes to a damage prevention effect related to the danger. Thereafter, the danger response evaluation device 10 gives notification of a result of the evaluation to the user. Accordingly, the danger response evaluation device 10 allows the user to check how much the response of the user contributes to the damage prevention effect related to the danger. This can provide an incentive to a response such as evacuation after the notification of the alarm to the user.

The danger response evaluation device 10 includes an input-output unit 11, a storage unit 12, a danger setting unit 131, a danger estimation unit 132, a danger determination unit 133, a response notification unit 134, a response plan record unit 135, a response record unit 136, a response evaluation unit 137, and a result notification unit 138.

The input-output unit 11 serves as an interface for data inputting and outputting to and from an external device. For example, the input-output unit 11 serves as an interface for data inputting and outputting to and from the user terminal 1 through the network and for receiving inputting of observation data or the like from the external device.

The storage unit 12 stores various kinds of information necessary for the danger response evaluation device 10 to operate. For example, the storage unit 12 includes an external information database (DB) 121, a response plan DB (response plan storage unit) 122, and a response DB (response information storage unit) 123.

The external information DB 121 stores external information (for example, observation data) obtained from the external device. The response plan DB 122 stores, for each kind of danger, information (response plan) indicating a plan of a response to a danger of the kind. The response DB 123 stores information indicating the content of an actual response of the user to a danger. The information is stored in the response DB 123 by, for example, the response record unit 136.

The storage unit 12 also stores the kind of danger as a target of estimation by the danger estimation unit 132, a threshold value used for determination by the danger determination unit 133, and the like in a predetermined region (not illustrated).

When having received inputting of the kind of danger as a target of estimation by the danger estimation unit 132, the danger setting unit 131 sets the kind of danger to the danger estimation unit 132. The danger setting unit 131 also sets the threshold value used for determination by the danger determination unit 133.

The danger estimation unit 132 estimates the content of a possible danger of a kind set in advance through simulation using information obtained from outside.

For example, the danger estimation unit 132 acquires observation data related to a danger of a kind as an estimation target from the external information DB 121 and performs simulation based on the acquired observation data. For example, when performing simulation related to rise of a river, the danger estimation unit 132 acquires observation data related to the increased amount of the water level of the river from the external information DB 121 and simulates increase of the water level of the river after elapse of a predetermined time from now.

The danger determination unit 133 determines whether the content of the danger, which is estimated by the danger estimation unit 132 exceeds a predetermined threshold value. For example, the danger determination unit 133 determines whether the water level of the river after elapse of the predetermined time from now, which is estimated through simulation by the danger estimation unit 132 exceeds the predetermined threshold value.

When it is determined by the danger determination unit 133 that the content of the danger exceeds the predetermined threshold value (in other words, when it is determined that a response to the danger is needed), the response notification unit 134 gives notification of an alarm that prompts a response to the danger. For example, when it is determined that the content of the danger exceeds the predetermined threshold value, the response notification unit 134 gives, to the user terminal 1 of each user who is potentially damaged by the danger, notification of an alarm that prompts a response to the danger.

The response plan record unit 135 stores a response plan input through the input-output unit 11 in the response plan DB 122. This response plan is, for example, information indicating, for each type of danger, a method of responding to a danger of the type, a check item for checking a response of the user, and the like.

The response record unit 136 stores the content (record data) of a response of the user to a danger, which is input through the input-output unit 11, in the response DB 123. For example, when having received the content (record data) of a response of the user to a danger from the user terminal 1 through the input-output unit 11, the response record unit 136 stores the content of the response in the response DB 123.

The response evaluation unit 137 determines how much the content of an actual response of the user to a danger corresponds to execution of a plan of a response to the danger, which is stored in the response plan DB 122. Then, the response evaluation unit 137 evaluates, based on a result of the determination, how much the content of an action of the user contributes to a damage prevention effect related to the danger.

For example, when a plan of a response to rise of a river has a check list of 10 items and the content of an actual response of the user fulfills six of the check items, the response evaluation unit 137 evaluates that assumed damage is reduced by 60% due to the response of the user.

The response evaluation unit 137 may convert the reduction rate of the assumed damage due to the response of the user, the reduction rate of damage cost, and the reduction rate of the number of victims into points to be given to the user having performed the response.

The result notification unit 138 gives notification of a result of evaluation by the response evaluation unit 137 to the user. For example, the result notification unit 138 gives, to the user terminal 1 of the user, notification of the reduction rate of assumed damage due to a response of the user, which is evaluated by the response evaluation unit 137 and points in accordance with the reduction rate.

According to the danger response evaluation device 10 described above, an actual response of the user is evaluated even when no damage occurs, and this provides an incentive to a proactive danger response of the user. As a result, a large number of damages can be prevented. Moreover, the danger response evaluation device 10 can provide an incentive to a more proactive danger response of the user by, for example, giving points to the user in accordance with a result of evaluation of a response of the user.

Subsequently, an exemplary processing procedure of danger response evaluation by the danger response evaluation device 10 will be described with reference to FIGS. 2 to 4.

Figure 2:
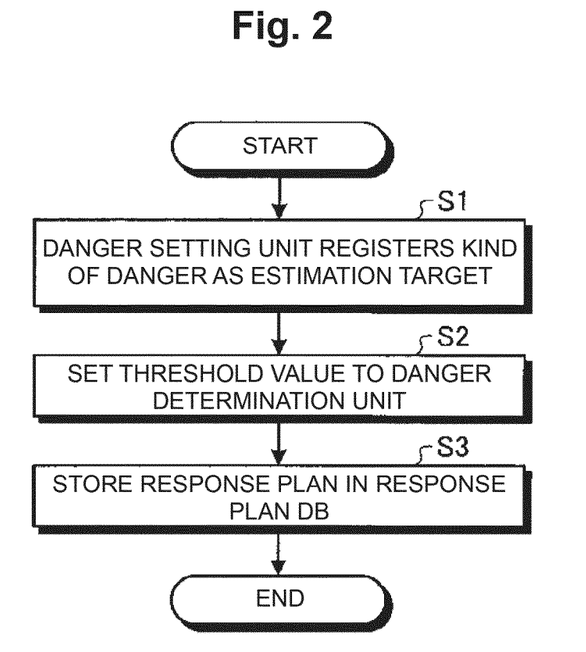
FIG. 2 is a flowchart illustrating an exemplary processing procedure of preparation of danger response evaluation performed by a danger response evaluation device in FIG. 1.

First, when having received inputting of the kind of danger (for example, "river rise") as a target of estimation by the danger estimation unit 132 through the input-output unit 11, the danger setting unit 131 of the danger response evaluation device 10 registers the kind of danger as the estimation target to the danger estimation unit 132 (S1 in FIG. 2).

When having received, through the input-output unit 11, inputting of a threshold value (for example, "river water level=x mm") used by the danger determination unit 133 to determine the content of a danger of the kind, the danger setting unit 131 sets the threshold value to the danger determination unit 133 (S2).

Then, when having received inputting of a response plan indicating a method of responding to the danger and check items thereof through the input-output unit 11, the response plan record unit 135 stores the response plan in the response plan DB 122 (S3). For example, when having received inputting of a response plan indicating check items for movement to a specified evacuation place when rise of a river has occurred, the response plan record unit 135 stores the response plan in the response plan DB 122.

Thereafter, when a danger of the kind registered at S1 in FIG. 2 is likely to occur, the danger response evaluation device 10 performs processing below.

Figure 3:
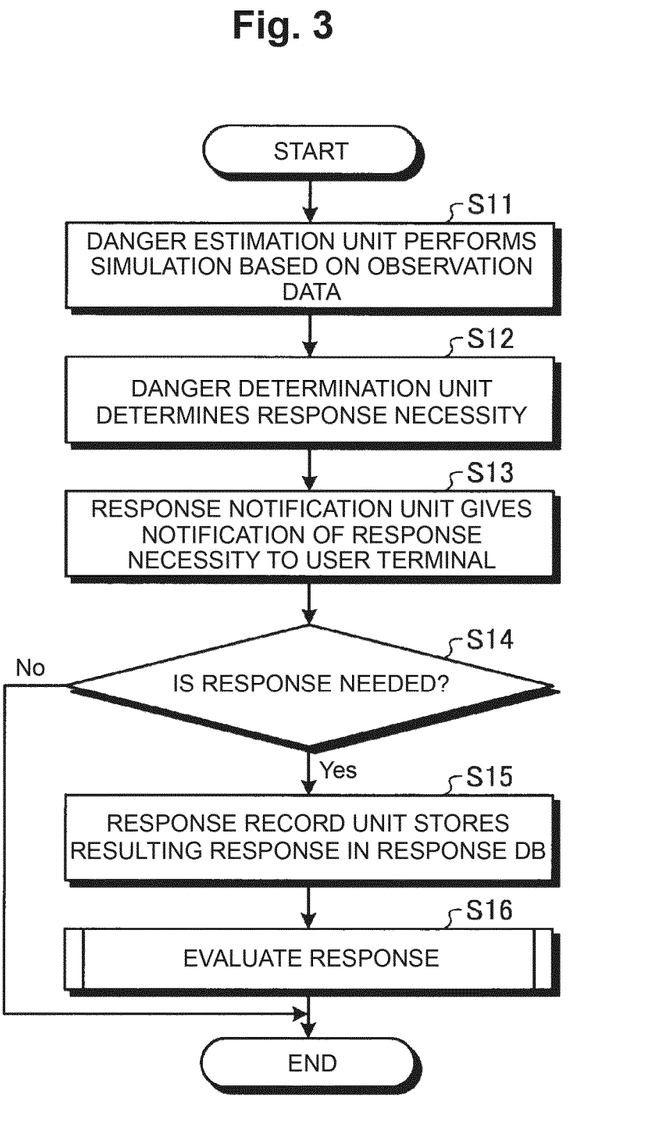
FIG. 3 is a flowchart illustrating an exemplary processing procedure of the danger response evaluation performed by the danger response evaluation device in FIG. 1.
Figure 4:
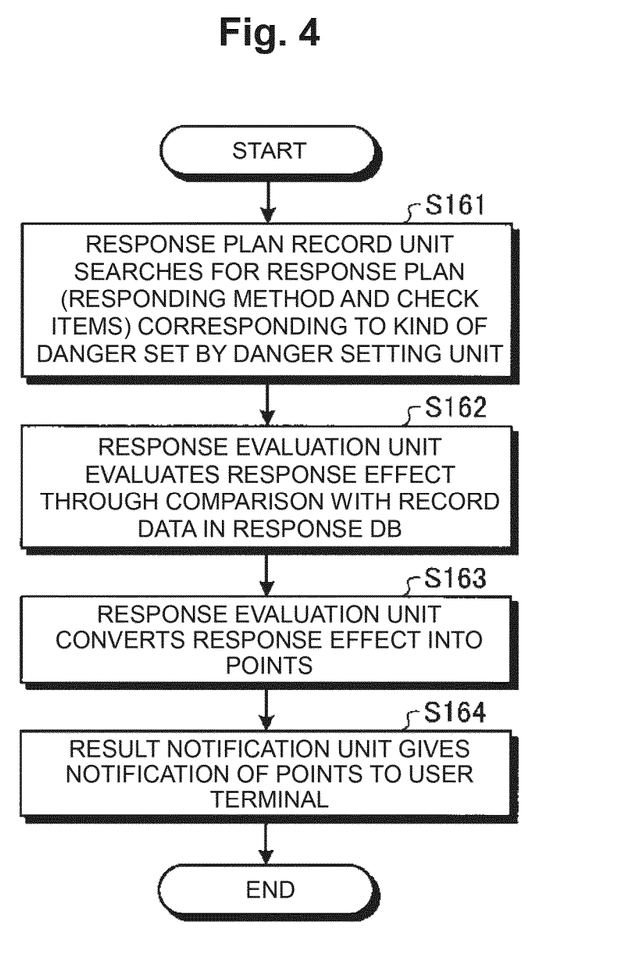
FIG. 4 is a flowchart illustrating an exemplary processing procedure of response evaluation in FIG. 3.

Specifically, the danger estimation unit 132 of the danger response evaluation device 10 performs simulation based on observation data (S11 in FIG. 3). For example, when the kind of danger set to the danger estimation unit 132 is "rise of a river", the danger estimation unit 132 simulates the water level of the river after elapse of a predetermined time from now based on observation data related to the water level of the river and stored in the external information DB 121.

After S11, the danger determination unit 133 determines the necessity of a response to the danger based on a result of the simulation performed at S11 and the threshold value set at S2 (S12). For example, the danger determination unit 133 determines whether the water level of the river after elapse of the predetermined time from now, which is estimated through the simulation at S11 exceeds x mm as the threshold value.

After S12, the response notification unit 134 gives notification of the response necessity determined at S12 to the user terminal 1 (S13).

For example, when it is determined at S12 that a response to the danger is needed (response needed), the response notification unit 134 transfers notification that prompts evacuation based on a response plan related to the danger to the user terminal 1 of any user who is potentially damaged by the danger.

When the danger determination unit 133 determines that no response is needed at S12 (No at S14), the processing is ended. Meanwhile, when the danger determination unit 133 determines that a response is needed at S12 (Yes at S14), the response record unit 136 stores a resulting response of the user in the response DB 123 (S15). For example, when having received a resulting response of the user (the content of the response to the danger, position information of the user terminal 1, and the like) from the user terminal 1 to which the notification is performed at S13, the response record unit 136 stores record data indicating the resulting response in the response DB 123.

After S15, the danger response evaluation device 10 evaluates the response of the user based on the resulting response of the user, which is stored in the response DB 123 (S16). Then, the processing is ended.

An example of the user response evaluation at S16 in FIG. 3 will be described below with reference to FIG. 4. First, the response plan record unit 135 searches for a response plan (the responding method and the check items) corresponding to the kind of danger set by the danger setting unit 131 (S161).

After S161, the response evaluation unit 137 evaluates an effect of the response by comparing the response plan searched at S161 with the record data in the response DB 123 (S162). For example, when the response plan searched at S161 has a check list of 10 items and it is determined based on the record data that six items of the check list are fulfilled by the user, the response evaluation unit 137 evaluates that assumed damage is reduced by 60% due to the response of the user.

After S162, the response evaluation unit 137 converts the effect of the response evaluated at S162 into points (S163). For example, the response evaluation unit 137 converts, into points, the reduction rate of the assumed damage, the reduction rate of damage cost, the reduction rate of the number of victims, and the like, which are evaluated at S162. Thereafter, the result notification unit 138 gives, to the user terminal 1, notification of the points obtained through the conversion at S163 (S164). In other words, the result notification unit 138 gives notification of points corresponding to the effect of the response to the user terminal 1 of the user having performed the response to the danger.

In this manner, the danger response evaluation device 10 evaluates the effect of the response of the user to the danger based on damage assumed through simulation, not damage actually caused by the danger. As a result, even when no damage occurs and the response of the user to the danger is futile, it is possible to properly evaluate the response of the user, thereby improving motivation of the user for a response to a danger in the future.

[Other Embodiments]

An incentive to a response of a user to a danger, which is provided by the danger response evaluation device 10 is not limited to the above-described points. The incentive may be, for example, cut of an insurance fee of the user, reception of a bonus, or tax reduction or exemption.

The response evaluation unit 137 may individually evaluate a response of a user transmitted from a user terminal 1 or may collectively evaluate responses of users transmitted from a plurality of user terminals 1.

For example, after notification of a danger to the user terminals 1 of users belonging to a group, the response evaluation unit 137 determines the number of users having actually responded to the danger among the users belonging to the group and the content of the response of each user based on responses transmitted from the user terminals 1 of the users. Then, the response evaluation unit 137 may evaluate a response of the entire group to the danger based on a result of the determination.

[Computer Program]

A computer program configured to achieve the functions of the danger response evaluation device 10 described in the above-described embodiments may be installed and implemented on a desired information processing device (computer). For example, the information processing device can function as the danger response evaluation device 10 by executing the above-described computer program provided as package software or online software. Such an information processing device is, for example, a desktop or laptop personal computer, or a rack-mounted server computer. Other examples of the information processing device include mobile communication terminals such as a smartphone, a cellular phone, and a personal handyphone system (PHS), as well as personal digital assistants (PDA). The danger response evaluation device 10 may be implemented on a cloud server.

Figure 5:
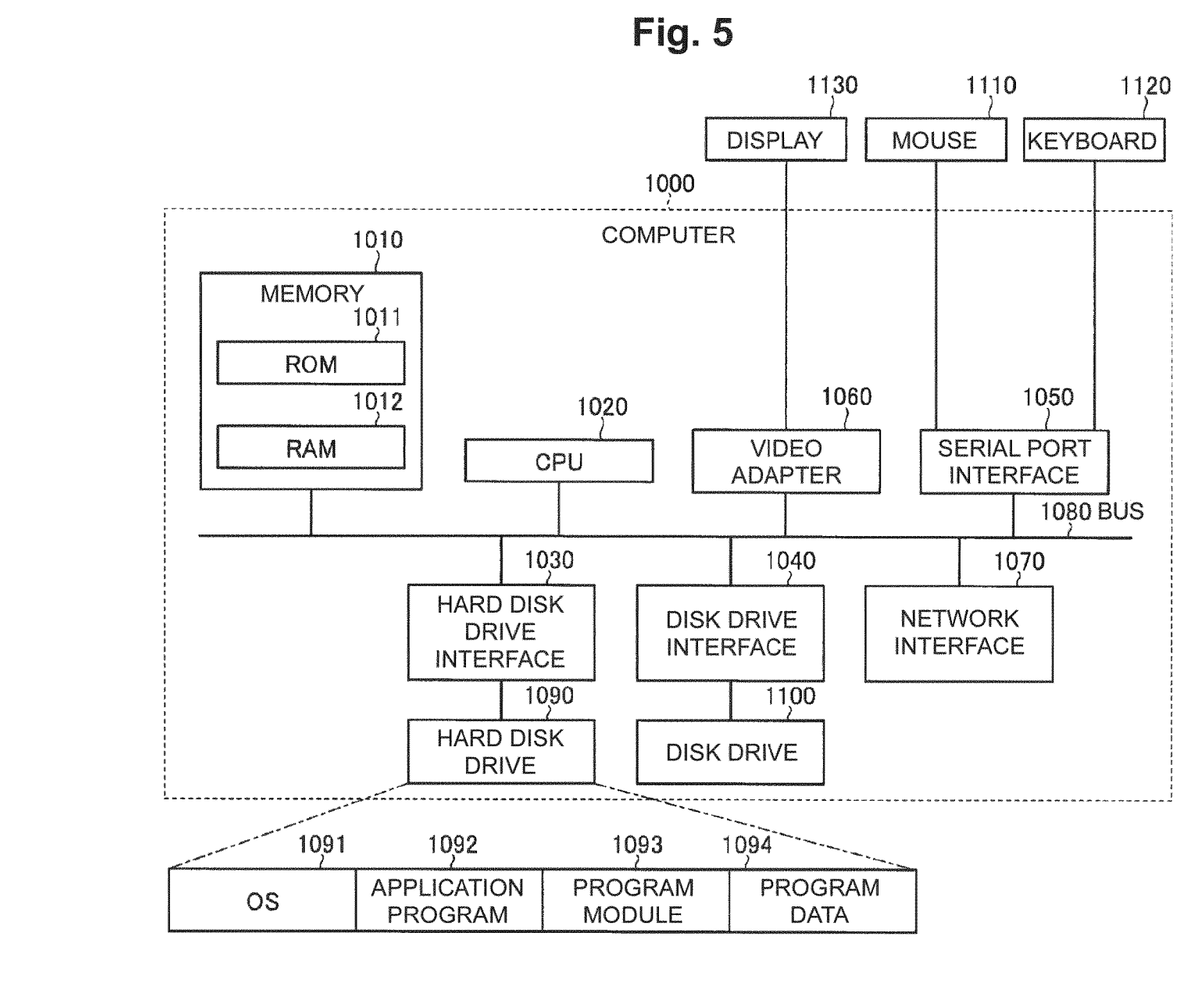
FIG. 5 is a diagram illustrating an exemplary computer configured to execute a danger response evaluation program.

An exemplary computer that executes the above-described computer program (danger response evaluation program) will be described below with reference to FIG. 5. As illustrated in FIG. 5, a computer 1000 includes, for example, a memory 1010, a CPU 1020, a hard disk drive interface 1030, a disk drive interface 1040, a serial port interface 1050, a video adapter 1060, and a network interface 1070. These components are connected with one another through a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected with a hard disk drive 1090. The disk drive interface 1040 is connected with a disk drive 1100. For example, a detachable storage medium such as a magnetic disk or an optical disk is inserted into the disk drive 1100. The serial port interface 1050 is connected with, for example, a mouse 1110 and a keyboard 1120. The video adapter 1060 is connected with, for example, a display 1130.

As illustrated in FIG. 5, the hard disk drive 1090 stores, for example, an OS 1091, an application program 1092, a program module 1093, and program data 1094. Various kinds of data and information described in the above-described embodiments are stored in, for example, the hard disk drive 1090 and the memory 1010.

Then, the CPU 1020 reads, onto the RAM 1012 as necessary, the program module 1093 and the program data 1094 stored in the hard disk drive 1090 and executes each above-described procedure.

The program module 1093 and the program data 1094 of the above-described danger response evaluation program are not limited to storage in the hard disk drive 1090 but may be, for example, stored in a detachable storage medium and read by the CPU 1020 through the disk drive 1100 or the like. Alternatively, the program module 1093 and the program data 1094 of the above-described computer program may be stored in another computer connected through a network such as a LAN or a wide area network (WAN) and read by the CPU 1020 through the network interface 1070.

REFERENCE SIGNS LIST

1 user terminal
10 danger response evaluation device
11 input-output unit
12 storage unit
121 external information DB
122 response plan DB
123 response DB
131 danger setting unit
132 danger estimation unit
133 danger determination unit
134 response notification unit
135 response plan record unit
136 response record unit
137 response evaluation unit
138 result notification unit

The invention claimed is:

1. A danger response evaluation device that evaluates a danger response of a user, the danger response evaluation device comprising:
   danger estimation circuitry configured to estimate a content of a possible danger of a kind set in advance through simulation using information obtained from outside;
   danger determination circuitry configured to determine whether the estimated content of the danger exceeds a predetermined threshold value;
   a response notification circuitry configured to give, to the user, notification of an alarm that prompts a response to the danger when it is determined that the content of the danger exceeds the predetermined threshold value;
   response plan memory configured to store, for each kind of danger, information indicating a plan of a response to a danger of the kind;
   response record circuitry configured to record a content of an actual response of the user to the danger after the notification of the alarm to the user;
   response evaluation circuitry configured to evaluate how much the content of the actual response of the user to the danger contributes to a damage prevention effect related to the danger by determining how much the content of the actual response of the user corresponds to execution of a plan of a response to the danger stored in the response plan memory; and
   result notification circuitry configured to give notification of a result of the evaluation to the user, convert the result of the evaluation into an amount of an incentive to be given to the user, and give notification of the amount of the incentive obtained through the conversion to the user.

2. The danger response evaluation device according to claim 1, wherein:
the amount of the incentive is a number of points to be given to the user.

3. The danger response evaluation device according to claim 1, wherein:
the response notification circuitry gives, to one or more users, notification of the alarm that prompts a response to the danger, and
the response evaluation circuitry evaluates how much a content of an actual response of the one or more users to the danger contributes to a damage prevention effect related to the danger by determining how much the content of the response of the one or more users corresponds to execution of a plan of a response to the danger stored in the response plan memory.

4. A danger response evaluation method executed by a danger response evaluation device, the danger response evaluation method comprising:
estimating a content of a possible danger of a kind set in advance through simulation using information obtained from outside;
determining whether the estimated content of the danger exceeds a predetermined threshold value;
giving, to the user, notification of an alarm that prompts a response to the danger when it is determined that the content of the danger exceeds the predetermined threshold value;
recording a content of an actual response of the user to the danger after the notification of the alarm to the user;
evaluating how much the content of the actual response of the user to the danger contributes to a damage prevention effect related to the danger by determining how much the content of the actual response of the user corresponds to execution of a plan of a response to the danger stored in a memory in advance;
giving notification of a result of the evaluation to the user;
converting the result of the evaluation into an amount of an incentive to be given to the user; and
giving notification of the amount of the incentive obtained through the conversion to the user.

5. A non-transitory computer readable medium which when executed causes a computer to perform:
estimating a content of a possible danger of a kind set in advance through simulation using information obtained from outside;
determining whether the estimated content of the danger exceeds a predetermined threshold value;
giving, to the user, notification of an alarm that prompts a response to the danger when it is determined that the content of the danger exceeds the predetermined threshold value;
recording a content of an actual response of the user to the danger after the notification of the alarm to the user;
evaluating how much the content of the actual response of the user to the danger contributes to a damage prevention effect related to the danger by determining how much the content of the actual response of the user corresponds to execution of a plan of a response to the danger stored in a memory in advance;
giving notification of a result of the evaluation to the user;
converting the result of the evaluation into an amount of an incentive to be given to the user; and
giving notification of the amount of the incentive obtained through the conversion to the user.

* * * * *